(12) United States Patent
Knott et al.

(10) Patent No.: US 8,722,836 B2
(45) Date of Patent: May 13, 2014

(54) SILOXANE NITRONES AND USE THEREOF

(71) Applicant: Evonik Industries AG, Essen (DE)

(72) Inventors: Wilfried Knott, Essen (DE); Pedro Cavaleiro, Viersen (DE); Bjoern Eicke, Bottrop (DE); Sadik Amajjahe, Duesseldorf (DE); Frauke Henning, Essen (DE); Kai Steenweg, Bottrop (DE)

(73) Assignee: Evonik Industries AG, Essen (DE)

( * ) Notice: Subject to any disclaimer, the term of this patent is extended or adjusted under 35 U.S.C. 154(b) by 0 days.

(21) Appl. No.: 13/715,830

(22) Filed: Dec. 14, 2012

(65) Prior Publication Data

US 2013/0261201 A1    Oct. 3, 2013

(30) Foreign Application Priority Data

Dec. 16, 2011   (DE) .................... 10 2011 088 787

(51) Int. Cl.
*C08G 77/26* (2006.01)
(52) U.S. Cl.
USPC .............. 528/28; 524/268; 528/25; 528/31
(58) Field of Classification Search
None
See application file for complete search history.

(56) References Cited

U.S. PATENT DOCUMENTS

| | | | |
|---|---|---|---|
| 3,988,229 A | 10/1976 | Pacifici et al. |
| 3,991,261 A | 11/1976 | Gruber et al. |
| 5,273,863 A | 12/1993 | Horn et al. |
| 5,371,161 A | 12/1994 | Knott et al. |
| 5,430,166 A | 7/1995 | Klein et al. |
| 5,430,167 A | 7/1995 | Klein et al. |
| 5,455,367 A | 10/1995 | Klein et al. |
| 5,475,127 A | 12/1995 | Klein et al. |
| 6,107,315 A | 8/2000 | Carney et al. |
| 6,162,579 A | 12/2000 | Stengel et al. |
| 6,255,511 B1 | 7/2001 | Klein et al. |
| 6,291,622 B1 | 9/2001 | Drose et al. |
| 6,307,082 B1 | 10/2001 | Klein et al. |
| 6,333,381 B1 | 12/2001 | Asada et al. |
| 6,489,498 B2 | 12/2002 | Klein et al. |
| 6,858,663 B2 | 2/2005 | Knott et al. |
| 7,018,458 B2 | 3/2006 | Knott et al. |
| 7,125,585 B2 | 10/2006 | Dudzik et al. |
| 7,157,541 B2 | 1/2007 | Knott et al. |
| 7,196,153 B2 | 3/2007 | Burkhart et al. |
| 7,485,684 B2 | 2/2009 | Parker |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,722,714 B2 | 5/2010 | Michael et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 8,138,294 B2 | 3/2012 | Henning et al. |
| 8,163,673 B2 | 4/2012 | Giessler-Blank et al. |
| 8,202,935 B2 | 6/2012 | Alzer et al. |
| 8,247,525 B2 | 8/2012 | Schubert et al. |
| 8,268,939 B2 | 9/2012 | Ebbrecht et al. |
| 8,283,040 B2 | 10/2012 | Spyrou et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 2002/0161158 A1 | 10/2002 | Burkhart et al. |
| 2004/0122225 A1 | 6/2004 | Parker |
| 2007/0128143 A1 | 6/2007 | Gruening et al. |
| 2007/0189672 A1 | 8/2007 | Yamaguchi et al. |
| 2007/0197678 A1 | 8/2007 | Cavaleiro et al. |
| 2007/0199477 A1 | 8/2007 | Hill et al. |
| 2007/0203307 A1 | 8/2007 | Cavaleiro et al. |
| 2007/0213226 A1 | 9/2007 | Sieverding et al. |
| 2008/0125503 A1 | 5/2008 | Henning et al. |
| 2008/0200576 A1 | 8/2008 | Seiler et al. |
| 2008/0269054 A1 | 10/2008 | Fleute-Schlachter et al. |
| 2009/0054238 A1 | 2/2009 | Fleute-Schlachter et al. |
| 2009/0137752 A1 | 5/2009 | Knott et al. |
| 2010/0022435 A1 | 1/2010 | Henning et al. |
| 2010/0029587 A1 | 2/2010 | Brueckner et al. |
| 2010/0041910 A1 | 2/2010 | Schubert et al. |
| 2010/0071849 A1 | 3/2010 | Knott et al. |
| 2010/0081781 A1 | 4/2010 | Schubert et al. |
| 2010/0113633 A1 | 5/2010 | Henning et al. |
| 2010/0197858 A1 | 8/2010 | Cavaleiro et al. |
| 2010/0216943 A1 | 8/2010 | Cavaleiro et al. |
| 2010/0249339 A1 | 9/2010 | Henning et al. |
| 2010/0292357 A1 | 11/2010 | Knott et al. |
| 2010/0298455 A1 | 11/2010 | Henning et al. |
| 2011/0021693 A1 | 1/2011 | Henning et al. |
| 2011/0034576 A1 | 2/2011 | Henning et al. |
| 2011/0042004 A1 | 2/2011 | Schubert et al. |
| 2011/0046305 A1 | 2/2011 | Schubert et al. |
| 2011/0172373 A1 | 7/2011 | Knott et al. |
| 2011/0230619 A1 | 9/2011 | Kuppert et al. |
| 2011/0230633 A1 | 9/2011 | Ferenz et al. |
| 2011/0301254 A1 | 12/2011 | Knott et al. |

(Continued)

FOREIGN PATENT DOCUMENTS

| | | |
|---|---|---|
| EP | 1239006 | 9/2002 |
| EP | 1439200 | 7/2004 |

(Continued)

OTHER PUBLICATIONS

"Dictionary of Natural Products", Chapman and Hall/CRC Press, Taylor and Francis Group, 2011 (in the online form http://dnp.chemnetbase.com/).

*Primary Examiner* — Marc Zimmer

(74) *Attorney, Agent, or Firm* — Frommer Lawrence & Haug LLP

(57) ABSTRACT

The invention relates to the production of nitrone-bearing siloxanes and their use as additives for radiation-curable coatings.

26 Claims, No Drawings

(56) References Cited

U.S. PATENT DOCUMENTS

| | | |
|---|---|---|
| 2011/0306694 A1 | 12/2011 | Glos et al. |
| 2012/0010302 A1 | 1/2012 | Hartung et al. |
| 2012/0027704 A1 | 2/2012 | Henning et al. |
| 2012/0046486 A1 | 2/2012 | Henning et al. |
| 2012/0067520 A1 | 3/2012 | Schubert et al. |
| 2012/0068110 A1 | 3/2012 | Schubert et al. |
| 2012/0071564 A1 | 3/2012 | de Gans et al. |
| 2012/0097883 A1 | 4/2012 | Henning et al. |
| 2012/0190760 A1 | 7/2012 | Henning et al. |
| 2012/0190762 A1 | 7/2012 | Hubel et al. |
| 2012/0282210 A1 | 11/2012 | Henning et al. |
| 2012/0296125 A1 | 11/2012 | Schubert et al. |

FOREIGN PATENT DOCUMENTS

| | | |
|---|---|---|
| EP | 1520870 | 4/2005 |
| EP | 1897917 | 3/2008 |
| EP | 2022574 | 2/2009 |
| EP | 2060561 | 5/2009 |
| JP | 2010153649 | 7/2010 |
| WO | WO 2005/041905 | 5/2005 |
| WO | WO 2009/074310 | 6/2009 |
| WO | WO 2009/136920 | 11/2009 |

SILOXANE NITRONES AND USE THEREOF

The present application claims priority from German Patent Application No. DE 10 2011 088 787.3 filed on Dec. 16, 2011, the disclosure of which is incorporated herein by reference in its entirety.

FIELD OF THE INVENTION

The invention relates to the production of nitrone-bearing siloxanes and their use as additives for radiation-curable coatings.

It is noted that citation or identification of any document in this application is not an admission that such document is available as prior art to the present invention.

Nitrones are versatile intermediates in a whole series of applications. For instance, nitrones are important intermediates in organic synthesis, particularly the [3+2] cycloaddition described by Huisgen (Huisgen et al., Chem Ber 102, 736-745, 1969). Nitrones are excellent 1,3-dipoles and therefore have the ability to combine with double and triple bonds to form 5-membered heterocyclic ring structures. The products of nitrones reacting with double and triple bonds are, for example isoxazolines and isoxazoles, respectively. Many bioactive molecules, for instance antibiotics, alkaloides, amine sugars and beta-lactams, have been synthesized in this way.

WO 2009/074310 describes for example the crosslinking of organic polynitrones with unsaturated polymers in the manner of a [3+2] cycloaddition. The polynitrones lead to enhanced flatting as well as serving as crosslinking agents.

WO 2009/136920 describes multifunctional nitrones in non-radical systems. The nitrones function as 1,3-dipoles and lead to the curing of formulations such as adhesives, coatings and encapsulants used in electronic applications for example. Cycloaddition here has the advantage of eliminating the need for inertization and also of avoiding volume shrinkage.

Nitrones are further known to be effective spin traps for free radicals. The diamagnetic nitrone is very quick to react with a free radical, which is paramagnetic and has a spin, to form a new, significantly more stable adduct of the free radical in the form of the nitroxide. Provided they live long enough, these nitroxide free-radicals are unambiguously detectable via electron spin resonance spectroscopy. Nitrones are therefore used in analytical chemistry to investigate free-radical processes, since the free radicals themselves frequently have an insufficiently long lifetime.

U.S. Pat. No. 6,107,315 describes the monofunctional spin-trapping reagent alpha-phenyl-N-tert-butylnitrone (PBN) which was administered to patients to treat symptoms associated with ageing and oxidative tissue damage.

The use of monofunctional nitrone-containing compounds for ameliorating the ageing of preparations of adhesives and sealants based on (meth)acrylic esters and organic hydroperoxide initiators is known from U.S. Pat. No. 3,991,261.

A distinctly improved potlife via addition of monofunctional organic nitrones is also proclaimed in U.S. Pat. No. 3,988,229 for photopolymerizable and photocrosslinkable polymers. Adding a nitrone improves the storage stability at 50° C. from initially 116 hours to more than 2000 hours.

A further special feature of nitrones is their UV-induced rearrangement into stable oxaziridines, which amounts to a photobleach. The incorporation of nitrones in the side chains of polyacrylates has thus been described in U.S. Pat. No. 5,273,863 for use as waveguides. On UV irradiation, the refractive index of the polymers changes as a result of the nitrones undergoing rearrangement to oxaziridines. U.S. Pat. No. 6,162,579 describes the use of monofunctional nitrones for multi-purpose applications in photopolymers. The nitrone additive acts both as a polymerization inhibitor and as a contrast enhancer.

Nitrone spin traps are further very useful for policing free-radical polymerization reactions. A suitable choice of nitrone makes it possible to achieve a narrow polydispersity compared with a conventionally conducted free-radical polymerization without nitrone (Polymer 46, 9632-9641, 2005). U.S. Pat. No. 6,333,381, for instance, describes the use of PBN to police the polymerization of various types of rubber. JP 2010153649 utilizes monomeric organic nitrones specifically as additives to obtain stable films of pure vinylcyclosiloxanes because the polymerization is slowed by the inhibiting properties of organic nitrones.

The functionalization of rubber polymers based on polymeric alkenes is another example of the use of polymers and is disclosed in U.S. Pat. No. 7,485,684. Here various lithium-terminated rubber polymers, for example polybutadiene or polyisoprene, react with monofunctional nitrones to form a hydroxylamine which enhances the interactions between rubber polymers and fillers, such as carbon black or silica gel, and hence provides a significant improvement in the dispersal of fillers and the resulting material properties of car tyres for example.

The use of nitrones has further also been described in cosmetic, household and textile applications. According to WO 2005/041905, nitrones and nitrone derivatives are used as stabilizers for coloured products such as skincare products, haircare products or laundry detergents for example. The nitrones are effective in preventing a decrease in colour intensity, as was determined by comparative irradiating tests.

EP 1239006 discloses the stabilization of polyethylene terephthalate (PET) and polyamides by means of nitrones. The addition of nitrones gave reduced acetaldehyde concentrations after the extrusion of PET or polyamides, as detected via GC/FID. PET and polyamides are common plastics used for production of plastic bottles, consumer goods and food packaging.

A number of processes are available for obtaining nitrones on an industrial scale. The most common method of achieving direct synthesis of nitrones is to condense an aldehyde with a hydroxylamine (Compr Org Chem, Vol. 2, 196-201, Pergamon Press, 1979).

Alternatively, the hydroxylamine can be prepared in situ and then reacted with an aldehyde. Cherry et al. (JOC, 50, 1531-1532, 1985) describe the synthesis of alpha-phenyl-N-tert-butylnitrone from benzaldehyde and 2-methyl-2-nitropropane using zinc powder.

Adv Synth Catal 2005, 347, 1223-1225 elucidates the oxidation of primary amines to the corresponding hydroxylamines in the presence of sodium tungstenate and a urea-hydrogen peroxide adduct.

The direct conversion of secondary amines to nitrones by oxidation is also known. Various catalysts are used for this. For instance, the amino groups of alkyl-alpha-amino acids are oxidized with sodium tungstenate (JOC 59, 6170, 1994) or else secondary amines using methyltrioxorhenium (MTO) to form the corresponding nitrones (JOC 61, 8099, 1996).

It is further known that imines are directly convertible into nitrones. Potassium permanganate, for instance, is useful for this as an oxidizing agent in the presence of a phase transfer catalyst (JOC 54, 126, 1989).

US 2004/0122225 further describes the use of DuPont™ Oxone® monopersulphate compound for oxidation of imines to oxaziridines and subsequent thermal treatment at 120° C. to bring about a rearrangement to the corresponding nitrones.

meta-Chloroperbenzoic acid (m-CPBA) has further been described as a useful reagent for oxidizing imines to nitrones. EP 2060561 discloses the synthesis of nitrones by oxidation of imines to form the corresponding nitrones. In effect, substituted imines of phenol which bear a substituent having a +M effect in the para position, are converted into nitrones without the oxidation leading to the intermediate oxaziridine.

Radiation-curable coatings are known and are described for example in "UV & EB curing formulation for printing inks, coatings & paints" (R. Holman, P. Oldring, London 1988).

The UV printing ink sector is in need of crosslinkable, modified silicone additives which in small concentrations improve the handleability of specifically mass-printed articles of manufacture in that these additives more particularly improve the mar resistance of fresh surfaces; enhance their lubricity; provide a strong release effect very rapidly after crosslinking; and remain stationary in the film owing to their crosslinking. Additives of this type shall have universal utility, largely irrespective of the type and composition of the printing ink to which they are added to improve the aforementioned properties. The additives shall be effective in very small amounts, and not have a deleterious effect on the performance characteristics of the printing ink. They shall more particularly not impair the formation of the surface film and the curing/hardening of the printing ink. They must further not have an adverse effect on the storage properties of the printing ink and must not cause the flow properties to worsen.

Polysiloxanes containing acrylic ester (acrylate) groups have hitherto proved very useful as additives which are curable/hardenable under high-energy radiation, for example for printing inks and in the manufacture of paint binders or for coatings for plastics, paper, wood and metal surfaces. Curing preferably takes place at low temperatures and is induced by electron beam radiation or by UV radiation in the presence of photoinitiators forming part of the prior art, for example benzophenone and benzophenone derivatives (EP 1897917).

One disadvantage of siloxane acrylates is their short pot-life, since the acrylate groups tend to polymerize. A further disadvantage of siloxane acrylates is the poor compatibility with the binder matrix. As a result, phase separation occurs over time. This problem has hitherto been tackled kinetically by getting the binder matrix or else additives to increase the viscosity of the mixture to such an extent that phase separation is practically ruled out.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

The present invention therefore has for its object to provide novel/alternative siloxanes that are useful as crosslinkers in binders for example and do not have one or more of the disadvantages of prior art siloxanes.

This object is surprisingly achieved by siloxanes functionalized with nitrone groups.

The present invention accordingly provides nitrone-containing polymers as described in the claims.

The present invention also provides a process for preparing silicon-containing polymers containing at least one nitrone group wherein a silicon-containing compound containing one or more aldehyde or keto groups is reacted with a nitrogen-monosubstituted hydroxylamine.

The present invention further provides preparations containing the polymers of the present invention and also for the use of the polymers of the present invention and of the preparations of the present invention as or in coatings and printing inks.

The polymers of the present invention have the advantage that their use provides radiation-curable coatings that have an improved profile of properties. These include, for example, a smooth and defect-free surface to the cured/hardened printing ink, which is characterized by low release values. A defect-free surface is notable for the absence of wetting defects such as, for example, craters, pinholes.

A further advantage of polymers according to the present invention is that they provide (more) storage-stable radiation-curable coating formulations where no phase separation occurs between the silicone-based additive and the more hydrophilic acrylate binders.

A further advantage is that the nitrone-bearing polymers of the present invention, when used as an additive, increase the viscosity of a bindered formulation versus the pure binder insignificantly. Insignificantly is preferably to be understood as meaning a maximum increase of 35%.

The nitrone-bearing polymers of the present invention are also advantageous over the known silicone acrylates without nitrone groups, for example, because the nitrones of the present invention can be used both as 1,3-dipoles and as radical scavengers. A further advantage of nitrone-bearing polymers according to the present invention over organic nitrones is their possible use as a surface additive in various formulations. The nitrone-bearing polymers of the present invention are further advantageous in that they contribute to enhancing the stability of acrylate formulations.

Storage stability for the purposes of the present invention is characterized by the homogeneity of preparations in that the added nitrone-bearing polymers of the present invention preferably show no phase separation tendency in the final preparation; more preferably, the preparations of the present invention show no formation of a phase boundary visible to the naked eye even after they have been stored at 50° C. for 14 days and then cooled down to room temperature.

The polymers of the present invention, the process of the present invention, the preparations obtainable with these and their use will now be described by way of example without any intention to restrict the invention to these exemplary embodiments. Where ranges, general formulae or classes of compounds are recited hereinbelow, these shall encompass not just the corresponding ranges or groups of compounds explicitly mentioned, but also all sub-ranges and sub-groups of compounds obtainable by removing individual values (ranges) or compounds. When documents are cited in the context of the present description, their contents shall fully form part of the disclosure content of the present invention. References hereinbelow to % ages are, unless otherwise stated, weight % ages. In the case of compositions, the % ages are based on the overall composition, unless otherwise stated. Averages recited hereinbelow are number averages, unless otherwise stated. Molar masses are weight-average molar masses Mw, unless expressly stated otherwise. Viscosity values recited in the context of this invention are to be understood as meaning, unless otherwise stated, dynamic viscosities which can be determined using methods familiar to a person skilled in the art. Measurements recited hereinbelow were determined at a pressure of 101325 Pa and a temperature of 23° C., unless otherwise stated.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The silicon-containing polymers of the present invention contain at least one nitrone group.

The polymers of the present invention are preferably silanes or (poly)siloxanes, preferably siloxanes.

Particularly preferred polymers of the present invention are (poly)siloxane nitrones of formula (I)

$$M^1{}_{a1}M^2{}_{a2}M^3{}_{a3}D^1{}_{b1}D^2{}_{b2}D^3{}_{b3}T_cQ_d \qquad (I)$$

where
$M^1 = [R^1{}_3SiO_{1/2}]$
$M^2 = [R^2R^1{}_2SiO_{1/2}]$
$M^3 = [R^3R^1{}_2SiO_{1/2}]$
$D^1 = [R^1{}_2SiO_{2/2}]$
$D^2 = [R^1R^2SiO_{2/2}]$
$D^3 = [R^1R^3SiO_{2/2}]$
$T = [R^1SiO_{3/2}]$
$Q = [SiO_{4/2}]$
where
a1 from 0 to 50, preferably <10, especially 0;
a2 from 0 to 50, preferably <10, especially 0;
a3 from 0 to 50, preferably 1-30, especially >0;
b1 from 10 to 5000, preferably from 10 to 1000, especially from 10 to 500;
b2 from 0 to 50, preferably from 0 to 25, especially 0;
b3 from 0 to 50, preferably from 0 to 25, especially >0;
c from 0 to 50, preferably from 0 to 10, especially 0;
d from 0 to 50, preferably from 0 to 10, especially 0;
with the proviso that at least one of the indices a3 and b3 is greater than 0, preferably greater than 1;
$R^1$ represents independently in each occurrence identical or different linear or branched, saturated or unsaturated hydrocarbon radicals of 1 to 30 carbon atoms or aromatic hydrocarbon radicals of 6 to 30 carbon atoms,
preferably alkyl radicals of 1 to 14 carbon atoms or monocyclic aromatics,
more preferably methyl, ethyl, propyl or phenyl,
most preferably methyl;
$R^2$ represents independently in each occurrence identical or different, linear or branched, saturated or unsaturated hydrocarbon radicals which may be substituted with nitrogen or oxygen atoms, preferred hydrocarbon radicals being alkyl radicals of 1 to 30 carbon atoms,
which may be substituted with one or more hydroxyl functions and/or nitrogen-bearing groups,
wherein the nitrogen-bearing groups may be in the quaternary form of ammonium groups,
which may be substituted with an epoxide group,
and/or which may be substituted with one or more carboxyl, amino acid, betaine and/or ester groups,
or $R^2$ is an aryl radical of 6 to 30 carbon atoms
or $R^2$ is a polyoxyalkylene radical of formula (IV),

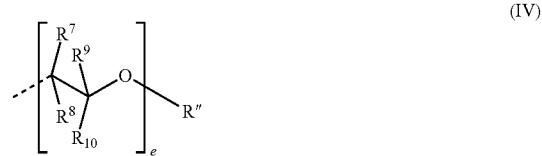

where
e is from 1 to 150, preferably from 2 to 100, more preferably greater than 2 and especially from 3 to 20,
$R^7$ or $R^8$ and also $R^9$ or $R^{10}$ in each occurrence are the same or different and independently represent hydrogen, monovalent alkyl radicals of 1 to 12 carbon atoms and/or aryl radicals of 6 to 12 carbon atoms,
which may optionally also be further substituted with hydroxyl, methoxy, ethoxy, methyl and/or ethyl groups,
or $R^7$ and $R^9$ and also independently thereof $R^8$ and $R^{10}$ may combine to form a ring which includes the atoms to which $R^7$ and $R^9$ on the one hand and $R^8$ and $R^{10}$ on the other are bonded,
or $R^7$ and $R^8$ and also independently thereof $R^9$ and $R^{10}$ may combine to form a ring which includes the atoms to which $R^7$ and $R^8$ on the one hand and $R^9$ and $R^{10}$ on the other are bonded,
wherein these rings may optionally also be further substituted with hydroxyl, methoxy, ethoxy, methyl and/or ethyl groups and/or be saturated and/or unsaturated,
wherein the individual fragments with the index e may differ from each other within the polyoxyalkylene radical of formula (IV) while forming a random distribution,
$R^{II}$ in each occurrence independently represents a hydrogen radical, substituted or unsubstituted $C_1$-$C_4$-alkyl, —C(O)NH—$R^I$, —C(O)O—$R^I$, —C(O)—$R^{III}$ where
$R^{III}$ represents substituted or unsubstituted $C_1$-$C_{12}$-alkyl, —CH$_2$—O—$R^I$, substituted or unsubstituted $C_6$-$C_{12}$-aryl,
preferably a benzyl group,
$R^I$ in each occurrence independently represents substituted or unsubstituted $C_1$-$C_{12}$-alkyl, substituted or unsubstituted $C_6$-$C_{12}$-aryl, substituted or unsubstituted $C_6$-$C_{30}$-alkaryl
$R^2$ is preferably
—CH$_2$—CH$_2$—CH$_2$—O—(CH$_2$—CH$_2$O—)$_x$—(CH$_2$—CH(R$^I$)O—)$_y$—R$^{II}$,
—CH$_2$—CH$_2$—O—(CH$_2$—CH$_2$O—)$_x$—(CH$_2$—CH(R$^I$)O—)$_y$—R$^{II}$,
—CH$_2$—CH$_2$—C$_2$—O—CH$_2$—CH(OH)—CH$_2$OH,
—CH$_2$—CH$_2$—(O)$_{x'}$—CH$_2$—R$^{IV}$, —CH$_2$—R$^{IV}$, or
—CH$_2$—CH$_2$—CH$_2$—O—CH$_2$—C(CH$_2$OH)$_2$—CH$_2$—CH$_3$, where x is from 0 to 100, preferably >0, especially from 1 to 50, x' is 0 or 1, y is from 0 to 100, preferably >0, especially from 1 to 50, x+y are preferably from 1 to 50, more preferably greater than 1, especially from 2 to 20, $R^I$, $R^{II}$ and $R^{III}$ are each as defined above, and $R^{IV}$ represents $C_1$-$C_{50}$-alkyl, cyclic $C_1$-$C_{50}$-alkyl, preferably $C_9$-$C_{45}$-alkyl, cyclic $C_9$-$C_{45}$- preferably $C_{13}$-$C_{37}$-alkyl, cyclic $C_{13}$-alkyl;

$R_3$ represents independently in each occurrence identical or different radicals of formula (II)

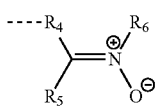

(II)

where $R^4$ represents a divalent discretional organic radical bonded to the siloxane, preferably substituted or unsubstituted $C_1$-$C_{30}$-alkylene which may also be interrupted by heteroatoms and in the case of interruption by nitrogen this nitrogen may also be quaternized, cyclic $C_3$-$C_{30}$-alkylene, substituted or unsubstituted $C_1$-$C_{30}$-alkyleneoxy, substituted or unsubstituted $C_6$-$C_{30}$-arylene, substituted or unsubstituted $C_6$-$C_{30}$-aryleneoxy, substituted or unsubstituted $C_1$-$C_{12}$-alkene-$C_6$-$C_{12}$-arylene, which may also be interrupted by heteroatoms and in the case of interruption by nitrogen this nitrogen may also be quaternized, and bear sulphates, chlorides and carboxylates, especially citrates, lactates, stearates and acetates as counter-ions, especially a radical of formulae IIIa to IIIi;

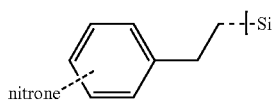 (IIIa)

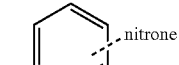 (IIIb)

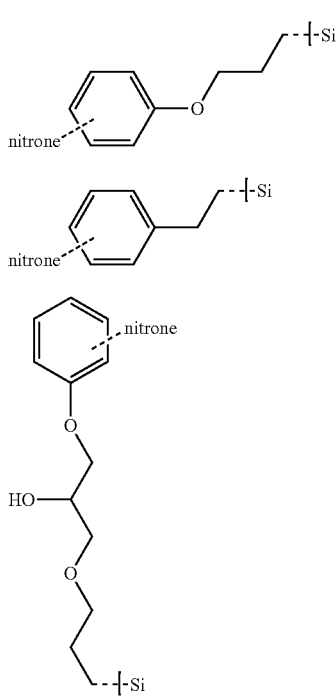 (IIId)

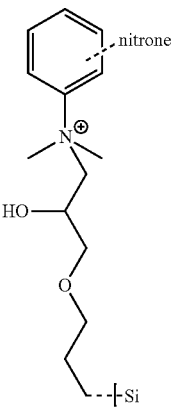 (IIIe)

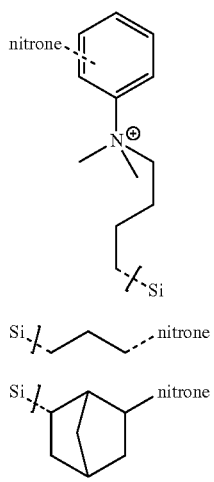 (IIIf)

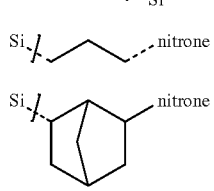 (IIIg)

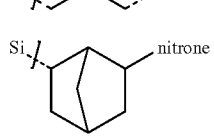 (IIIh)

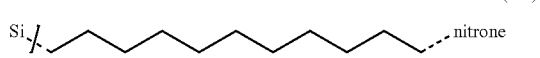 (IIIi)

where nitrone is a radical of formula (II), where Si represents the siloxane; wherein the nitrone radicals in the formulae (IIIa-IIIf) can be arranged in the ortho, meta or para position, preferably in the ortho or para position, especially in the para position; is more preferably a radical of formula (IIIa) or (IIIb);

$R^5$ represents hydrogen, substituted or unsubstituted $C_1$-$C_{30}$-alkyl, substituted or unsubstituted $C_6$-$C_{30}$-aryl, substituted or unsubstituted $C_6$-$C_{30}$-heteroaryl, substituted or unsubstituted $C_1$-$C_{12}$-alk-$C_6$-$C_{12}$-aryl, substituted or unsubstituted $C_1$-$C_{30}$-alkyloxy, substituted or unsubstituted cyclic $C_3$-$C_{30}$-alkyl, preferably hydrogen or substituted or unsubstituted $C_1$-$C_{20}$-alkyl or $R^5$ represents a radical such as $R^4$, in which case the compositions of $R^5$ and $R^4$ need not be identical;

$R^6$ represents substituted or unsubstituted $C_1$-$C_{30}$-alkyl, substituted or unsubstituted $C_6$-$C_{30}$-aryl, substituted or unsubstituted $C_6$-$C_{30}$-heteroaryl, substituted or unsubstituted $C_1$-$C_{12}$-alk-$C_6$-$C_{12}$-aryl, substituted or unsubstituted $C_1$-$C_{30}$-alkyloxy, substituted or unsubstituted cyclic $C_3$-$C_{30}$-alkyl, preferably substituted or unsubstituted $C_1$-$C_{20}$-alkyl, more preferably $C_1$-$C_7$-alkyl;

It may be advantageous for a3 to be =2 and b3 to be =0 in the polymers of formula (I) according to the present invention.

It is particularly preferable for the polymers of formula (I) according to the present invention to be linear polysiloxanes (c and d=0), preferably those which are terminally nitrone-substituted.

$R^4$ in the polymers of the present invention preferably represents a para-substituted radical of formula (IIIa).

It is preferable in the polymers of the present invention for $R^5$ to represent a hydrogen atom and for $R^6$ to represent a methyl group.

Particularly preferred polymers of the present invention are those of formula (I) wherein, a3=2, b3=0, c and d=0, $R^4$ represents a para-substituted radical of formula (IIIa), $R^5$ represents a hydrogen atom and $R^6$ represents a methyl group.

The various fragments of the siloxane chains indicated in formula (I) may form a statistical distribution or blockwise arrangement. Statistical distributions may have a blockwise construction with any number of blocks and any sequence or be subject to a randomized distribution, they may also have an alternating construction or else form a gradient along the chain, more particularly they can also form any hybrid thereof. The indices used in formulae (I) and (IV) must be regarded as numerical means of the statistical distributions mentioned.

Nitrones in the context of this invention are N-oxides of an imine which can be expressed by the tautomers of the formulae

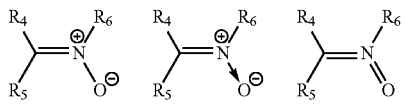

More particularly, all mesomeric and tautomeric as well as free-radical species as recited in "Synthesestrategien zur gezielten Kontrolle makromolekularer Architekturen" (Herbert Utz Verlag, 2000) at page 16 are included.

All double bonds, even when they represent a preferred constitution, denote not only the E but also the Z configuration or denote not only the cis but also the trans configuration.

Wherever molecules or fragments of molecules have one or more stereocentres or can be differentiated into isomers because of symmetries or can be differentiated into isomers because of other effects, for example restricted rotation, all possible isomers are also encompassed by the present invention.

Isomers are known to a person skilled in the art, see particularly the definitions of Prof. Kazmaier at Saarland University, e.g. http://www.uni-saarland.de/fak8/kazmaier/PDF_files/vorlesungen/Stereochemie%20Strassb%20Vorlage.pdf.

When reference is made to natural material products, for example lactate, in the context of this invention, this reference is in principle to be understood as meaning all isomers, although the particular naturally occurring isomers are preferred, i.e. the L-lactate in the case mentioned here.

As to the definition of natural products, reference is made to the scope of the "Dictionary of Natural Products", Chapman and Hall/CRC Press, Taylor and Francis Group, for example in the online form of 2011: http://dnp.chemnetbase.com/.

The word fragment "poly" encompasses in the context of this invention not just compounds having three or more repeat units of one or more monomers in the molecule, but especially also compositions of compounds which have a molecular weight distribution and the mean molecular weight of this distribution is at least 200 g/mol. This definition takes account of the fact that it is common practice in the pertinent art to call such compounds polymers even though they do not appear to satisfy a polymer definition as per OECD or REAC guidelines.

The index numbers reproduced herein and the value ranges of the indices recited can be understood as means of the possible statistical distribution of structures actually present and/or mixtures thereof. This also holds for structural formulae which on the face of it have been reproduced as exact, for example for formula (I) and formula (IV).

The polymers of the present invention are obtainable in various ways. The polymers of the present invention are preferably obtained by the hereinbelow described process of the present invention.

The process which the present invention provides for producing silicon-containing polymers containing at least one nitrone group comprises reacting at least one silicon-containing polymer containing one or more aldehyde or keto groups, preferably only one or more aldehyde groups and no keto groups, with one or more nitrogen-monosubstituted hydroxylamine(s). The reaction preferably takes the form of a condensation reaction.

The reaction is preferably carried out using a molar ratio of aldehyde and/or keto groups to hydroxylamine in a range from 1:1 or 1:above 1. The molar ratio is preferably in the range from 1:1.1 to 1:3 and more preferably in the range from 1:1.5 to 1:2.

Any known nitrogen-monosubstituted hydroxylamines can be used in the process of the present invention. Useful nitrogen-monosubstituted hydroxylamines include more particularly for example aromatic ones, for example N-benzylhydroxylamine, N-(n-nitrobenzyl)hydroxylamine, N-phenylhydroxylamine, imidazole-2-methylhydroxylamine, benzoxazole-2-methylhydroxylamine, furfurylhydroxylamine, or aliphatic hydroxylamines, for example N-methylhydroxylamine, N-ethylhydroxylamine, N-propylhydroxylamine, N-isopropylhydroxylamine, N-tert-butylhydroxylamine, N-amylhydroxylamine, N-(2-propene)hydroxylamine, N-(2-propynyl)hydroxylamine, or alkoxy-substituted hydroxylamine, for example polyethylene oxide hydroxylamine, or cyclically substituted hydroxylamine, for example N-cyclohexylhydroxylamine. N-Methylhydroxylamine is preferably used in the process of the present invention.

The nitrogen-monosubstituted hydroxylamines used according to the present invention can be released from their salts, some of which are the preferred commercial products, by addition of bases. Useful bases include inorganic bases, preferably alkali or alkaline earth metal hydroxides, alkali or alkaline earth metal carbonates; useful organic bases include aliphatic or aromatic amino compounds, while organic aromatic bases can be derivatives of pyridine, imidazole, pyrrolidine or pyrrole, but preference is given to tertiary amines such as identically or differently substituted trialkylamines, preferably triethylamine.

Hydroxylamine release by adding a base can be effected in a two-phase system composed of water and a solvent that has limited miscibility with water; solvents can be ionic liquids as recited in EP 2022574, preferably 1-ethyl-3-methylimidazolium chloride, 1-ethyl-3-methylimidazolium hexafluorophosphate, 1-ethyl-3-methylimidazolium tetrafluoroborate or 1-butyl-3-methylimidazolium chloride, or else organic solvents, preferably selected from dichloromethane, chloroform, diethyl ether, ethyl acetate, toluene or hexane. Release can also be effected without adding a further organic solvent or water, in which case separation takes the form of, for example, phase separation; in this case, an aqueous solution of the hydroxylammonium salt can be reacted with the base, or alternatively the hydroxylamine is added to an aqueous solution of a base, or the hydroxylammonium salt can be dissolved in an organic solvent.

The thus provided nitrogen-monosubstituted hydroxylamines or their solutions in organic solvents may still contain residues of the bases used. The amount of base present can be up to 5 wt %, preferably less than 3 wt %, more preferably less than 1 wt %, even more preferably less than 0.5 wt % and especially less than 0.1 to above 0 wt %, based on the nitrogen-monosubstituted hydroxylamine.

A residual level within the limits specified above, or an addition of base may possibly be advantageous in the reaction with the aldehyde-functional polysiloxanes.

The reaction according to the present invention is preferably conducted so as to attain a conversion of 85%, preferably 90% and more preferably 95% for keto/aldehyde groups into nitrone groups.

The reaction according to the present invention can be conducted at a temperature of 10 to 200° C., preferably of 20 to 100° C. and more preferably of 25 to 40° C.

The reaction according to the present invention may preferably be conducted at a pressure of 0.5 to 20 bar, more preferably from 1 to 5 bar and even more preferably at atmospheric pressure.

The reaction according to the present invention may preferably be conducted at a pH of 3 to 10, more preferably 4 to 9 and even more preferably 5 to 8.

The reaction according to the present invention may be carried out in the presence or absence of one or more bases. The reaction is preferably carried out in the presence of 0 to 30 wt %, more preferably carried out in the presence of above 0 to 10 wt % and even more preferably carried out in the presence of 0.1 to 5 wt % based on the reaction mixture.

Useful bases include inorganic bases, preferably alkali or alkaline earth metal hydroxides or alkali or alkaline earth metal carbonates, or organic bases such as, for example aliphatic or aromatic amino compounds, for example derivatives of pyridine, imidazole, pyrrolidine or pyrrole, or tertiary amines such as identically or differently substituted trialkylamines, preferably triethylamine.

The reaction according to the present invention can be conducted not only in daylight but also in the absence of light and is preferably conducted in the absence of light.

The water formed in the course of the reaction may be removed from the reaction mixture in a continuous manner using drying agents, membrane processes or distillation, or alternatively be separated off after the reaction has ended.

The resulting silicon-containing polymers containing at least one nitrone group can be worked up or used directly. Working up can take the form for example of extraction and subsequent filtration with or without filter aids. Useful extractants for the process of the present invention are water or organic solvents or mono- or multiphasic mixtures thereof. Useful organic solvents include for example ethyl acetate, butyl acetate, ethyl methyl ketone, xylene, toluene, chloroform, dichloromethane, hexane, petroleum ether, diethyl ether, polyethers or ionic liquids.

Any compounds meeting the criteria of being silicon-containing polymers having one or more aldehyde or keto groups can be used. These compounds are obtainable as described in the prior art.

Silicon-containing polymers having one or more aldehyde or keto groups are preferably obtained by reacting a polysiloxane having at least one SiH group with a compound having at least one C—C multiple bond, preferably double bond, and also at least one keto or aldehyde group. The reaction can be conducted as a hydrosilylation for example. Hydrosilylation can be conducted as described for example in EP1520870.

Useful catalysts for the hydrosilylation reaction include, for example, platinum compounds, for example hexachloroplatinic acid, cisplatin, bis(cyclooctene)platinum dichloride, carboplatin, platinum0-divinyltetramethyldisiloxane complexes, so-called Karstedt catalysts, or else platinum0 complexes with different olefins. Useful catalysts further include in principle rhodium, iridium and ruthenium compounds, for example tris(triphenylphosphine)rhodium(I) chloride or tris(triphenylphosphine)ruthenium(II) dichloride. Preferred catalysts for the purposes of the process according to the present invention are platinum0 complexes. Particular preference is given to Karstedt catalysts or so-called WK catalysts, which are obtainable as described in EP1520870.

Catalysts are preferably used in an amount of 0.1 to 1000 ppm, more preferably in an amount of 1 to 100 ppm and even more preferably in an amount of 5 to 30 ppm based on the total batch for the hydrosilylation reaction.

Useful SiH-containing polysiloxanes for producing the siloxanes having keto or aldehyde groups, especially in the transition metal-catalysed hydrosilylation of alpha-, omega-SiH-siloxanes, include lateral di- or polyhydrosiloxanes and/or terminally and laterally SiH-functional polysiloxanes. The reaction is preferably with aliphatically unsaturated aldehydes or ketones such as, for example, allyloxybenzaldehyde, 3-vinylbenzaldehydes, acrolein, 10-undecenal, 5-norbornene-2-carboxaldehydes, allylacetones, 4-allyloxy-2-hydroxybenzophenones. The reaction is preferably conducted at a temperature of 20 to 200° C., more preferably at 23 to 150° C. and even more preferably at 70 to 100° C. The reaction can be carried out at reduced, atmospheric or superatmospheric pressure, while the reaction is preferably carried out at atmospheric pressure and especially at the preferred temperatures as well as atmospheric pressure.

The hydrosilylation process with complete conversions, i.e. conversions of 99%, preferably 99.9%, more preferably 99.999% and especially 99.999999% is preferably conducted as described in the prior art, for example in EP 1520870.

The reaction, especially the hydrosilylation, is preferably conducted using a molar ratio of 1:1 or 1:above 1 for Si—H groups to olefinic double bonds on the compounds bearing aldehyde and/or keto groups. The molar ratio is preferably in the range from 1:1.1 to 1:2.5 and more preferably in the range from 1:1.5 to 1:2.

The SiH-functional polysiloxanes used in the hydrosilylation step are obtainable for example in accordance with the prior art as described for example in EP 1439200.

A person skilled in the art is aware that catalysts suitable for the hydrosilylation reaction deliver lower yields in the presence of specific substances and the catalytic reaction can even cease in the presence of specific substances; substances of this type are frequently referred to as catalyst poisons. Substances of this type are thiols or mercaptans, for example phosphorus(III) compounds, e.g. trialkylphosphines, or acids, e.g. inorganic acids such as hydrogen chloride (i.e. hydrochloric acid in the presence of water), e.g. organic acids such as acetic acid, amino compounds as well as organic or inorganic bases are not exclusively a catalyst poison in relation to this reaction, but also react in turn with the corresponding carbonyl compound. Catalysts poisons should not be present in the reaction mixture in the hydrosilylation step which is preferred according to the present invention; that is, their concentration for each case should be below 1% (w/w), preferably below 0.1% (w/w) and more preferably below 0.01% (w/w), especially below 1 ppm based on the reaction mixture.

A subsequent distillation/purification of the hydrosilylation products can be advantageous as a further subsidiary step of the process according to the present invention. The distillation/purification can be carried out for example using a thin-film evaporator, preferably at a temperature of 20 to 250° C., more preferably 50 to 180° C. and even more preferably 100 to 150° C. The pressure is preferably in the range from 0 to 0.02 bar, more preferably in the range from above 0 to 0.1 bar and even more preferably in the range from 0.000001 to 0.001 bar. The distillation/purification can be especially advantageous to remove excess olefins having keto and/or aldehyde groups.

It can be advantageous when the silicon-containing polymers containing one or more aldehyde or keto groups are produced as part of the process according to the present invention in a step which precedes the reaction of the present invention.

Both process steps (producing a silicon-containing polymer containing one or more aldehyde or keto groups (process step 1) and reacting the silicon-containing polymer containing one or more aldehyde or keto groups with a nitrogen-monosubstituted hydroxylamine (process step 2)) can be conducted in the process of the present invention not only as a one-pot reaction, but also in succession as separately conducted steps or else under controlled metered addition, preferably as a one-pot reaction. The reaction can be conducted in a batch, semi-batch or continuous process.

The nitrone-bearing polymers of the present invention are optionally also obtainable in a process other than the process of the present invention, in which case these reaction products are also expressly encompassed by the present invention.

The high SiC selectivity of the process according to the present invention is particularly advantageous for the platinum-catalysed hydrosilylation of aldehyde-containing olefins. This is surprising, since hydrosilylations of carbonyl double bonds are known in the prior art (THL 48, 2007, 2033-2036).

formation of hydrolysis-labile SiOC bonds which is known in the prior art as an undesired secondary reaction to the noble metal-catalysed hydrosilylation of aldehyde functional olefinically unsaturated compounds is suppressed in process step 1 of the present invention.

A further advantage to the process of the present invention is the possibility of producing the silicon-containing polymers containing at least one nitrone group in a one-step synthesis (one-pot process). Thus, the synthesis of the silicon-containing polymer containing one or more aldehyde or keto groups and the reaction of the silicon-containing polymer containing one or more aldehyde or keto groups with a nitrogen-monosubstituted hydroxylamine can be carried out consecutively in one and the same reactor without any need for a work-up between the steps.

The process of the present invention can be used for example to produce the silicon-containing polymers containing at least one nitrone group which are in accordance with the present invention.

The silicon-containing polymers containing at least one nitrone group which are in accordance with the present invention are useful for example for producing preparations which are in accordance with the present invention. The preparations of the present invention contain the silicon-containing polymers containing at least one nitrone group which are in accordance with the present invention. The preparations of the present invention may contain further added substances such as, for example, siccatives, flow control agents, colours and/or colour pigments, wetting agents, binders, reactive diluents, surfactants, thermally activatable initiators, photo-initiators, catalysts, emollients, emulsifiers, antioxidants, hydrotropes (or polyols), solid and filler materials, pearl lustre additives, insect repellents, anti-foulants, nucleators, preservatives, optical brighteners, flame retardants, antistats, blowing agents, plasticizers/softeners, perfumes, active ingredients, care additives, superfatting agents, solvents and/or viscosity modulators. Colours and/or colour pigments are preferred additives.

The polymers according to the present invention, the polymers obtained according to the present invention and/or the preparations according to the present invention are useful for example in or as coatings or printing inks.

Preferably, however, the preparations of the present invention do not contain any emulsifiers or stabilizers.

The preparations of the present invention are notable for particularly good stability in storage. The preparations have prolonged storability without phase separation, meaning they do not have to be subjected to any further mechanical treatment, especially stirring operations, before they are used for coating purposes. The length of time for which preparations according to the present invention can be stored at room temperature is typically 3 years, preferably 2 years, more preferably one year and especially 3 months. Room temperature phase separation must not amount to more than 5% by volume, preferably not more than 1% by volume and especially less than 1% by volume in terms of the calculation in the examples.

Preferably, the preparations include from 0.1 to 99 wt % of silicon-containing polymers containing at least one nitrone group which are in accordance with the present invention, or of polymers obtained according to the present invention, preferably from 0.5 to 10 wt % and especially from 1 to 3 wt % based on the preparation. The preparation preferably includes at least one binder. One or more than one binder is preferably a polymer having double bonds and/or further functional groups such as, for example, hydroxyl, amine, mercaptan, aldehyde, ketone, nitrile, ether, thioether, imines, hydrazines, phosphite, phosphate, epoxy, isocyanate, ester, amide, lactone, lactam, imide, urethane, urea, and preferably the binder includes acryloyl groups. Preferably, the preparations include the binder at from 60 to 99 wt %, preferably from 70 to 98 wt %, more preferably at from 80 to 97 wt % and even more preferably at from 90 to 96 wt % based on the preparation. Preferably, the preparations include from 0.01 to 5 wt %, preferably from 0.1 to 4 wt %, more preferably from 0.5 to 3 wt % and especially from 0.9 to 3 wt % of added substances, especially those mentioned above, based on the preparation.

Preferably, the preparations of the present invention which contain the silicon-containing polymers containing at least one nitrone group or which are in accordance with the present invention, or the polymers obtained in accordance with the present invention and the binder, each in their preferred weight fractions, and optionally one or more added substances, likewise in their preferred weight fractions, have a viscosity of below 40 000 mPa·s, preferably below 10 000 mPa·s, more preferably below 5000 mPa·s, even more preferably below 1000 mPa·s and especially below 500 mPa·s.

The silicon-containing polymers contain at least one nitrone group which are in accordance with the present invention as well as the preparations which are in accordance with the present invention are especially useful for producing printed or coated areas.

Any desired materials can be printed or coated, preferred materials being textile, wood, stone, ceramics, glass, metal, paper, plastics.

The coated, for example printed or painted, surfaces obtained using the preparations of the present invention are notable for superior or at least equivalent values in the nail test following water immersion, in the snap-off test or in the release test.

The examples recited hereinbelow describe the present invention by way of example without any intention to restrict the invention, the scope of which is apparent from the entire description and the claims, to the embodiments mentioned in the examples.

EXAMPLES

General Methods and Materials

NMR:

The recording and interpretation of NMR spectra is known to a person skilled in the art ("NMR Spectra of Polymers and Polymer Additives" by A. Brandolini and D. Hills, 2000, Marcel Dekker. Inc.).

The spectra were recorded with a Bruker Spectrospin spectrometer at room temperature, the measuring frequency used to record proton spectra being 400 MHz. In the proton spectrum, the signals of the aldehyde (CHO) and the signal of the nitrone (CHNR—O) appear at about 9.9 ppm and at about 7.3 ppm respectively, for example. The conversion in respect of all hydrogen-bearing silicon atoms (SiH value) can be determined from the SiH signal by both $^1$H NMR spectroscopy ($\delta$=0 to 12 ppm), but also via $^{29}$Si NMR spectroscopy ($\delta$=−5- to −10 and −30 to −40 ppm), respectively.

Viscosity:

Viscosities were determined using an LVT Brookfield Synchro-Lectric rotary viscometer and LV2 spindle in line with German standard specification DIN 5391.

Brookfield viscometers are rotary viscometers having defined spindle sets as rotary bodies. The rotary bodies used were from an LV spindle set. Owing to the temperature dependence of viscosity, the temperatures of the viscometer and of the measuring liquid were kept at a constant 23° C. during the measurement with an accuracy of +/−0.5° C. Materials used in addition to the LV spindle set were a thermostatable waterbath, a 0-100° C. thermometer (scale divisions 1° C. or smaller) and a timer (scale values not greater than 0.1 second). To perform the measurement, 100 ml of the sample were introduced into a wide-neck bottle and measured under temperature-controlled conditions in the absence of air bubbles after prior calibration. To determine the viscosity, the viscometer was positioned relative to the sample such that the spindle dips into the product up to the mark. The measurement is initiated by activating the start button while taking care to ensure that the measurement took place in the most favourable region of 50% (+/−20%) of the maximum measurable torque. The result of the measurement was displayed by the viscometer in mPas, while division by the density (g/ml) gives the viscosity in mm$^2$/s.

The particulars regarding the compositions as per formula (I) in the examples which follow are numerical mean values and relate to the calculated molar mass Mn.

Materials:

EBECRYL® is a registered trade mark of Cytec Industries, Inc., New Jersey, USA. The products EBECRYL 450 and 812 are polyester acrylates. EBECRYL 220 is an aromatic urethane acrylate.

BYK® is a registered trade mark of BYK-Chemie GmbH, Wesel. The product UV 3510 is a polyether-modified polydimethylsiloxane.

The Karstedt solutions used are platinum0-divinyltetramethyldisiloxane complexes in decamethylcyclopentasiloxane at a concentration of 0.1 wt % of platinum (available from Umicore at 21.37 wt % of platinum, diluted with decamethylcyclopentasiloxane to 0.1 wt % Pt).

Example 1

Preparation of Inventive Siloxane Nitrones

Synthesis Example S1 (UL-5478+UL-5481):
$M^3{}_2D^1{}_{78}$ 100 g of an alpha, omega-dihydropolydimethylsiloxane (M=6667 g/mol) having an SiH value of 0.3 eq SiH/kg were added dropwise in 30 minutes at 70° C. to a mixture of 7 g of 4-allyloxybenzaldehyde (available from Sigma Aldrich, order No. 544396, 97%) and 0.11 g of a 1% by weight Karstedt solution in a four-neck flask equipped with a KPG blade stirrer, an internal thermometer, a dropping funnel and a reflux condenser under agitation. The mixture was stirred at 80° C. for a further hour. The experimentally determined SiH value indicated complete conversion of the SiH groups. Excess 4-allyloxybenzaldehyde was repeatedly washed off with methanol. Then, 70 g of the hydrosilylation product was stirred with 1.65 g of N-methylhydroxylamine (prepared from 3.0 g of N-methylhydroxylamine*HCl salt (obtainable from Sigma Aldrich, order No. M50400, 98%) and 3.6 g of triethylamine) dissolved in 15 ml of dichloromethane were stirred overnight at room temperature. This was followed by a 3-fold extraction with a 1:1 (by volume) diethyl ether/water mixture and subsequent drying with sodium sulphate. The solvent was removed in a rotary evaporator (40° C.) and the product was dried in vacuo (1 mbar/40° C.). The $^1$H NMR spectrum showed complete conversion of the aldehyde groups to the corresponding nitrones.

Synthesis Example S2 (UL-5508): $M^3{}_2D^3{}_3D^1{}_{75}$ 125 g of a polymethylhydrosiloxane (M=5882 g/mol) having an SiH value of 0.85 eq SiH/kg were added dropwise in 30 minutes at 80° C. to a mixture of 18.73 g of 4-allyloxybenzaldehyde (obtainable from Sigma Aldrich, order No. 544396, 97%) and 0.14 g of a 1 weight percent Karstedt solution in a four-neck flask equipped with a KPG stirrer, an internal thermometer, a dropping funnel and a reflux condenser under agitation. The mixture was stirred at 80° C. for 4 hours. Then, a further 0.14 g of a 1 weight percent Karstedt solution was added followed by stirring at 80° C. for a further 2 hours. The experimentally determined SiH value indicated complete conversion of the SiH groups. Excess 4-allyloxybenzaldehyde (boiling point: 152° C. at 24 mbar) was separated off using a thin-film evaporator. Then, the hydrosilylation product was admixed with the filtrate of the suspension from 100 mL of dichloromethane, 10.55 g of N-methylhydroxylamine*HCl (obtainable from Sigma Aldrich, order No. M50400, 98%) and 12.7 g of triethylamine and stirred overnight at room temperature. This was followed by 3-fold extraction with a 1:1 (by volume) diethyl ether/water mixture and subsequent drying with sodium sulphate. The solvent was removed in a rotary evaporator (40° C.) and the product was dried in vacuo (1 mbar/40° C.). The $^1$H NMR spectrum revealed complete conversion of the aldehyde groups to the corresponding nitrones.

Synthesis Example S3 (UL-5508): $M^3{}_2D^3{}_6D^1{}_{200}$ 125 g of a pentahydropolydimethylsiloxane (M=15385 g/mol) having an SiH value of 0.52 eq SiH/kg were added dropwise in 30 minutes at 80° C. to a mixture of 13.2 g of 4-allyloxybenzaldehyde (obtainable from Sigma Aldrich, order No. 544396, 97%) and 0.14 g of a 1 weight percent Karstedt solution in a four-neck flask equipped with a KPG stirrer, an internal thermometer, a dropping funnel and a reflux condenser under agitation. The mixture was stirred at 80° C. for 1.5 hours. Then, a further 0.14 g of a 1 weight percent Karstedt solution was added followed by stirring at 80° C. for a further 3.5 hours. The experimentally determined SiH value indicated complete conversion of the SiH groups. Excess 4-allyloxybenzaldehyde (boiling point: 152° C. at 24 mbar) was separated off using a thin-film evaporator. Then, the hydrosilylation product was admixed with the filtrate of the suspension from 80 mL of dichloromethane, 7.38 g of N-methylhydroxylamine*HCl (obtainable from Sigma Aldrich, order No. M50400, 98%) and 8.9 g of triethylamine and stirred overnight at room temperature. This was followed by 3-fold extraction with a 1:1 (by volume) diethyl ether/water mixture and subsequent drying with sodium sulphate. The solvent was removed in a rotary evaporation (40° C.) and the product was dried in vacuo (1 mbar/40° C.). The $^1$H NMR spectrum revealed complete conversion of the aldehyde groups to the corresponding nitrones.

Synthesis Example S4 (GP-O-113): $M^3{}_2D^3{}_4D^1{}_{78}$ 32.5 g of a 1,3,5,7-tetramethylcyclotetrasiloxane (obtainable from abcr, 95%) were added dropwise in 70 minutes at 60° C. to a mixture of 67.5 g of styrene (obtainable from Sigma Aldrich, >99%) and 0.1 mL of a 1 weight percent Karstedt solution in a four-neck flask equipped with a KPG stirrer, an internal thermometer, a dropping funnel and a reflux condenser under agitation. The mixture was stirred at 70° C. for a further 5 hours. The experimentally determined SiH value indicated complete conversion of the SiH groups. Excess styrene was removed with a rotary evaporator at 100° C. and 3 mbar.

23.7 g of this compound were stirred with 206 g of an alpha, omega-dihydropolydimethylsiloxane (M=6667 g/mol) having an SiH value of 0.3 eq SiH/kg and 0.23 g of trifluoromethanesulphonic acid (available from Sigma Aldrich, 98%) in a four-neck flask equipped with a KPG stirrer, an internal thermometer and a reflux condenser at 25° C. for 5 hours. Then, 116 mL of toluene were added followed by stirring at 60° C. for a further 5 hours. Then, 4.6 g of sodium bicarbonate (available from J.T. Baker) were added, which was followed by filtration and distillation at 110° C. and 3 mbar.

183.1 g of this styrene-containing siloxane having an SiH value of 0.22 eq SiH/kg were added dropwise to a mixture of 7.8 g of 4-allyloxybenzaldehyde (obtainable from Sigma Aldrich, order No. 544396, 97%) and 0.1 mL of a 1 weight percent Karstedt solution in a four-neck flask equipped with a KPG stirrer, an internal thermometer, a dropping funnel and a reflux condenser in 10 minutes at 80° C. under agitation. The mixture was stirred at 80° C. for a further hour. The experimentally determined SiH value indicated complete conversion of the SiH groups. Excess 4-allyloxybenzaldehyde (boiling point: 152° C. at 24 mbar) was removed with a thin-film evaporator. Then, the hydrosilylation product was admixed with 3.9 g of N-methylhydroxylamine*HCl (obtainable from Sigma Aldrich, order No. M50400, 98%), 4.9 g of sodium carbonate (obtainable from KMF, ultrapure) and 1.5 g of sodium sulphate (obtainable from Merck, ultrapure) and stirred at room temperature overnight. This was followed by dilution with n-hexane and addition of filter aid and filtration with a Pall Corporation K 200 depth filter 3.9 mm in thickness and finally, at 50° C. and 3 mbar, distillation. The $^1$H NMR spectrum revealed complete conversion of the aldehyde groups to the corresponding nitrones.

Synthesis Example S5 (GP-O-111): $M^3{}_2D^3{}_4D^1{}_{78}$ 22.9 g of a 1,3,5,7-tetramethylcyclotetrasiloxane (available from abcr, 95%) were added dropwise to a mixture of 77.1 g of dodecene (available from Sigma Aldrich, >99%) and 0.1 mL of a 1 weight percent Karstedt solution in a four-neck flask equipped with a KPG stirrer, an internal thermometer, a dropping funnel and a reflux condenser in 70 minutes at 60° C. under agitation. The mixture was stirred at 70° C. for a further hour. The experimentally determined SiH value indicated a complete conversion of the SiH groups. Excess dodecene was removed with a rotary evaporator at 100° C. and 3 mbar.

25.5 g of this compound were stirred with 159.5 g of an alpha, omega-dihydropolydimethylsiloxane (M=6667 g/mol) having an SiH value of 0.3 eq SiH/kg and 0.19 g of trifluoromethanesulphonic acid (available from Sigma Aldrich, 98%) in a four-neck flask equipped with a KPG stirrer, an internal thermometer and a reflux condenser at 25° C. for 5 hours. Then, 115 mL of toluene were added followed by stirring at 60° C. for a further 5 hours. Then, 4.6 g of sodium bicarbonate (available from J.T. Baker) were added, followed by filtration and distillation at 110° C. and 3 mbar.

136.7 g of this dodecene-containing siloxane having an SiH value of 0.22 eq SiH/kg were added dropwise to a mixture of 5.4 g of 4-allyloxybenzaldehyde (available from Sigma Aldrich, order No. 544396, 97%) and 0.1 mL of a 1 weight percent Karstedt solution in a four-neck flask equipped with a KPG stirrer, an internal thermometer, a dropping funnel and a reflux condenser in 10 minutes at 80° C. under agitation. The mixture was stirred at 80° C. for a further 1.5 hours. The experimentally determined SiH value indicated complete conversion of the SiH groups. Excess 4-allyloxybenzaldehyde (boiling point: 152° C. at 24 mbar) was separated off with a thin-film evaporator. Then, the hydrosilylation product was admixed with 3.0 g of N-methylhydroxylamine*HCl (obtainable from Sigma Aldrich, order No. M50400, 98%), 3.8 g of sodium carbonate (obtainable from KMF, ultrapure) and 1.2 g of sodium sulphate (obtainable from Merck, ultrapure) and stirred at room temperature overnight. This was followed by dilution with n-hexane and addition of filter aid and filtration with a Pall Corporation K 200 depth filter 3.9 mm in thickness and finally; at 50° C. and 3 mbar, distillation. The $^1$H NMR spectrum revealed complete conversion of the aldehyde groups to the corresponding nitrones.

Synthesis Example S6 (GP-O-105): $M^3{}_2D^1{}_{78}$ 579 g of an alpha, omega-dihydropolydimethylsiloxane (M=6667 g/mol) having an SiH value of 0.3 eq SiH/kg were added dropwise in 60 minutes at 70° C. to a mixture of 40 g of 4-allyloxybenzaldehyde (available from Sigma Aldrich, order No. 544396, 97%) and 0.6 mL of a 1 weight percent Karstedt solution in a four-neck flask equipped with a KPG stirrer, an internal thermometer, a dropping funnel and a reflux condenser under agitation. The mixture was stirred at 70° C. for a further 3.4 hours. The experimentally determined SiH value indicated complete conversion of the SiH groups. Excess 4-allyloxybenzaldehyde (boiling point: 152° C. at 24 mbar) was separated off with a thin-film evaporator. Then, the hydrosilylation product was admixed with 3.0 g of N-cyclohexylhydroxylamine*HCl (obtainable from Sigma Aldrich, 97%), 3.4 g of sodium carbonate (obtainable from KMF, ultrapure) and 2.1 g of sodium sulphate (obtainable from Merck, ultrapure) and stirred at room temperature overnight. This is followed by dilution with n-hexane and addition of filter aid and filtration with a Pall Corporation K 200 depth filter 3.9 mm in thickness and finally, at 50° C. and 3 mbar, distillation. The $^1$H NMR spectrum revealed complete conversion of the aldehyde groups to the corresponding nitrones.

Synthesis Example S7 (GP-O-105): $M^3{}_2 D^1{}_{78}$ 42 g of the hydrosilylation product from synthesis example S6 were admixed with 3.0 g of N-benzylhydroxylamine*HCl (available from Sigma Aldrich, 97%), 3.4 g of sodium carbonate (available from KMF, ultrapure) and 2.1 g of sodium sulphate (available from Merck, ultrapure) and stirred overnight at room temperature. This is followed by dilution with n-hexane and addition of filter aid and filtration with a Pall Corporation K 200 depth filter 3.9 mm in thickness and finally, at 50° C. and 3 mbar, distillation. The $^1$H NMR spectrum revealed complete conversion of the aldehyde groups to the corresponding nitrones.

Synthesis Example S8

300 g of an alpha, omega-hydropolydimethylsiloxane (M=5556 g/mol) having an SiH value of 0.36 eq SiH/kg were added dropwise to a mixture of 19.98 g of undecylenealdehyde (available from Sigma Aldrich, order No. 132276, 95%) and 0.32 g of a 1 weight percent Karstedt solution in a four-neck flask equipped with a KPG stirrer, an internal thermometer, a dropping funnel and a reflux condenser in 1 hour at 80° C. under agitation. After 2.5 and 6 hours a further 0.16 g of a 1 weight percent Karstedt solution was added each time. The mixture was stirred at 80° C. for altogether a further 10 hours. The experimentally determined SiH value indicated complete conversion of the SiH groups. Excess undecylenealdehyde (boiling point: 100° C. at 5 mbar) was distilled off at 120-125° C. and 3 mbar in the course of 2 hours. Then, the hydrosilylation product was admixed with the filtrate of the suspension from 20 g of dichloromethane, 1.7 g of N-methylhydroxylamine*HCl (available from Sigma Aldrich, order No. M50400, 98%) and 2.1 g of triethylamine and stirred at room temperature overnight. This was followed by a filtration with a fluted filter. Then, the dichloromethane was distilled off followed finally by a further filtration. A clear viscous product is formed. The $^1$H NMR spectrum indicated complete conversion of the aldehyde groups to the corresponding nitrones.

Example 2

Production of Inventive Preparations and Comparative Preparations

The preparations reported in Tables 1 and 2 were produced by mixing the components. In addition, a blank sample B3 was produced on the basis of preparation A3 without additive.

TABLE 1

Compositions of inventive preparations as per Example 2

| | Binder | Additive |
|---|---|---|
| Z1 | 56.4 g EBECRYL ® 450 | 3.6 g Additive S1 |
| Z2 | 56.4 g EBECRYL ® 220 | 3.6 g Additive S1 |
| Z3 | 56.4 g UV-Offset (Zeller + Gmelin) | 3.6 g Additive S1 |
| Z4 | 56.4 g EBECRYL ® 812 | 3.6 g Additive S1 |

TABLE 2

Compositions of non-inventive preparations as per Example 2

| | Binder | Additive |
|---|---|---|
| A1 | 56.4 g EBECRYL ® 450 | 3.6 g BYK ®-UV 3510 |
| A2 | 56.4 g EBECRYL ® 220 | 3.6 g BYK ®-UV 3510 |
| A3 | 56.4 g UV-Offset (Zeller + Gmelin) | 3.6 g BYK ®-UV 3510 |
| A4 | 56.4 g EBECRYL ® 812 | 3.6 g BYK ®-UV 3510 |

B3: 56.4 g of UV-Offset (Zeller+Gmelin), without additive as blank comparator

Example 3

Use of Preparations as Additive for UV-Curable Coatings

The preparations were applied using an offset roll. The preparations Z3, A3 and B3 from Example 2 were poured onto a PET foil and uniformly distributed using the offset roll. The ink-wetted offset roll was then used to wet a further PET foil, which constituted the sample foil. A uniform ink layer was produced on the PET foil.

The ink was cured at room temperature and for 1 second per pass on an IST UV rig with a mercury vapour UV lamp M 300 K 2 H and a radiative spectrum of 180-450 nm at 120 W/cm and 10 m/min with 4 passes on the top surface and 2 passes on the bottom surface.

Example 4

Determination of Properties of Preparations as Per Example 2

Viscosity was measured as described above.

TABLE 3

Viscosities (as per Example 4) of preparations (as per Example 2)

| Binder | Viscosity [mPa * s] | Preparations | Viscosity [mPa * s] |
|---|---|---|---|
| EBECRYL ® 450 | 8278 | Z1 | 11100 |
| EBECRYL ® 220 | 18600 | Z2 | 19500 |
| EBECRYL ® 812 | 8000 | Z4 | 10500 |

Storage Stability:

Preparations Z1-Z4 and A1-A4 as per Example 2 were dispermat stirred at 9000 rpm for 60 min. The samples were subsequently stored in a drying cabinet at 50° C. for 14 days and at room temperature for 3 months. After storage, the preparations were cooled down to room temperature and assessed for phase separation by visual inspection.

The separated volume of the top phase was considered relative to the volume used (total volume of additive in the preparation) of the additive and rated as follows:

TABLE 4

Results of storage stability tests as per Example 4

| Preparation | Storage stability 14 d, 50° C. | 3 m, RT | Preparation | Storage stability |
|---|---|---|---|---|
| Z1 | +++ | +++ | A1 | − |
| Z2 | +++ | +++ | A2 | − |
| Z3 | +++ | nd | A3 | + |
| Z4 | +++ | nd | A4 | − |

+++ excellent (no phase separation, 0% by volume),
++ very good (10% by volume),
+ good (30% by volume),
o satisfactory (50% by volume),
− poor (complete phase separation, 100% by volume)
nd not determined

Example 5

Determination of Properties of Coatings as Per Example 3

Water Immersion:
The sample foil pieces were placed in water, so the entire coated surface was wetted by water. It was left there for 3 hours.

Snap-Off Test:
A Tesa® strip from Tesa was applied by hand to the coated surface using forceful pressure, left there for 24 or 3 hours and then snapped off with a pull. Colour remaining stuck to the adhesive tape is judged adversely. The greater this effect, the poorer the quality.

Release Test:
Two Tesa® strips were stuck by hand onto each sample foil, onto the grease- and dust-free sample foil, left there for 24 h and subsequently peeled off using an Instron 3342 machine at a uniform rate of 15 mm/sec, while measuring the force needed for this. The lower the force needed, the better the release effect. The force was reported in cN.

Nail Test:
The thumb nail was used to score the coating on the PET sample foil. The sample was assessed according to how easy this was, the applicable rule being: the easier, the worse. This test was carried out before and after water immersion.

TABLE 5

Results of performance tests as per Example 5

| Criterion | B3 | A3 | Z3 |
|---|---|---|---|
| Nail test (3 h) | ++/++ | ++/++ | +++/+++ |
| Tesa test (24 h) | −/− | ++/++ | +++/+++ |
| Tesa test (3 h) | ++/++ | ++/++ | +++/+++ |
| Release [cN] | >1700 | 67 | 78 |

Results each before/after water immersion
+++ excellent,
++ very good,
+ good,
o satisfactory,
− poor It is clearly apparent that nitrone-bearing polysiloxanes are outstandingly useful as a surface additive for UV offset inks. They are notable for excellent miscibility with the different binder systems and outstanding stability in storage. Release is in line with that of standard commercial products.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. Polymers, each comprising:
silicon; and
at least one nitrone group.

2. The polymers according to claim 1;
wherein the polymers are siloxanes.

3. The polymers according to claim 1;
wherein the polymers are siloxane nitrones of formula (I):

$$M^1_{a1}M^2_{a2}M^3_{a3}D^1_{b1}D^2_{b2}D^3_{b3}T_c Q_d \qquad (I):$$

where:
$M^1 = [R^1_3 SiO_{1/2}]$;
$M^2 = [R^2 R^1_2 SiO_{1/2}]$;
$M^3 = [R^3 R^1_2 SiO_{1/2}]$;
$D^1 = [R^1_2 SiO_{2/2}]$;
$D^2 = [R^1 R^2 SiO_{2/2}]$;
$D^3 = [R^1 R^3 SiO_{2/2}]$;
$T = [R^1 SiO_{3/2}]$; and
$Q = [SiO_{4/2}]$;

where:
a1 from 0 to 50;
a2 from 0 to 50;
a3 from 0 to 50;
b1 from 10 to 5000;
b2 from 0 to 50;
b3 from 0 to 50;
c from 0 to 50;
d from 0 to 50;
with the proviso that at least one of the indices a3 and b3 is greater than 0;

where $R^1$ represents independently in each occurrence identical or different linear or branched, saturated or unsaturated hydrocarbon radicals of 1 to 30 carbon atoms or aromatic hydrocarbon radicals of 6 to 30 carbon atoms;

where $R^2$ represents independently in each occurrence identical or different, linear or branched, saturated or unsaturated radical selected from the group consisting of
hydrocarbon radicals which may be substituted with:
one or more hydroxyl functions and/or nitrogen-bearing groups, wherein the nitrogen-bearing groups may be in the quaternary form of ammonium groups;
an epoxide group; and/or
one or more carboxyl, amino acid, betaine and/or ester groups;
aryl radicals of 6 to 30 carbon atoms;
polyoxyalkylene radicals of formula (IV):

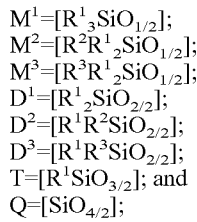

(IV)

where e is from 1 to 150;
where $R^7$, $R^8$, $R^9$, $R^{10}$ in each occurrence are the same or different and independently represent hydrogen, monovalent alkyl radicals of 1 to 12 carbon atoms, and/or aryl radicals of 6 to 12 carbon atoms, which may optionally also be further substituted with hydroxyl, methoxy, ethoxy, methyl, and/or ethyl groups;

where $R^7$ and $R^9$ may alternatively combine to form a ring which includes the atoms to which $R^7$ and $R^9$ are bonded;

where $R^8$ and $R^{10}$ may alternatively combine to form a ring which includes the atoms to which $R^8$ and $R^{10}$ are bonded;

where $R^7$ and $R^8$ may alternatively combine to form a ring which includes the atoms to which $R^7$ and $R^8$ are bonded, where $R^9$ and $R^{10}$ may combine to form a ring which includes the atoms to which $R^9$ and $R^{10}$ are bonded;

wherein any ring formed by $R^7$ and $R^9$, $R^8$ and $R^{10}$, $R^7$ and $R^8$, and $R^9$ and $R^{10}$ may optionally also be further substituted with hydroxyl, methoxy, ethoxy, methyl, and/or ethyl groups, and/or be saturated or unsaturated, wherein the individual fragments with the index e may differ from each other within the polyoxyalkylene radical of formula (IV) while forming a random distribution;

where R" in each occurrence independently represents a hydrogen radical, substituted or unsubstituted $C_1$-$C_4$-alkyl, —C(O)NH—$R^I$, —C(O)O—$R^I$, or —C(O)—$R^{III}$, where:

$R^{III}$ represents substituted or unsubstituted $C_1$-$C_{12}$-alkyl, —CH$_2$—O—$R^I$, or substituted or unsubstituted $C_6$-$C_{12}$-aryl; and $R^I$ in each occurrence independently represents substituted or unsubstituted $C_1$-$C_{12}$-alkyl, substituted or unsubstituted $C_6$-$C_{12}$-aryl, or substituted or unsubstituted $C_6$-$C_{30}$-alkaryl; and where $R_3$ represents independently in each occurrence identical or different radicals of formula (II):

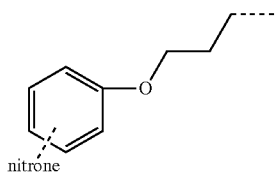

(II)

where $R^4$ represents a divalent discretional organic radical bonded to the siloxane;

where $R^5$ represents:

hydrogen, substituted or unsubstituted $C_1$-$C_{30}$-alkyl, substituted or unsubstituted $C_6$-$C_{30}$-aryl, substituted or unsubstituted $C_6$-$C_{30}$-heteroaryl, substituted or unsubstituted $C_1$-$C_{12}$-alk-$C_6$-$C_{12}$-aryl, substituted or unsubstituted $C_1$-$C_{30}$-alkyloxy, or substituted or unsubstituted cyclic $C_3$-$C_{30}$-alkyl; or a radical as set forth for $R^4$, in which case the compositions of $R^5$ and $R^4$ need not be identical;

where $R^6$ represents substituted or unsubstituted $C_1$-$C_{30}$-alkyl, substituted or unsubstituted $C_6$-$C_{30}$-aryl, substituted or unsubstituted $C_6$-$C_{30}$-heteroaryl, substituted or unsubstituted $C_1$-$C_{12}$-alk-$C_6$-$C_{12}$-aryl, substituted or unsubstituted $C_1$-$C_{30}$-alkyloxy, or substituted or unsubstituted cyclic $C_3$-$C_{30}$-alkyl.

4. The polymer according to claim 3;
wherein:
a3=2; and
b3=0.

5. The polymer according to claim 3;
wherein:
a1=0,
a2=0;
a3=2;
b1=10 to 500;
b2=0;
b3=0;
c=0; and
d=0;
wherein $R^1$ represents a methyl group; and
wherein $R^4$ represents a para-substituted radical of formula (IIIa):

wherein $R^5$ represents a hydrogen atom and
wherein $R^6$ represents a methyl group.

6. A process for preparing polymers comprising silicon and at least one nitrone group, the process comprising:
reacting a polymer comprising silicon and one or more aldehyde or keto groups, with a nitrogen-monosubstituted hydroxylamine.

7. The process according to claim 6;
wherein the polymer is a siloxane.

8. The process according to claim 6;
wherein the polymer is an aldehyde-functional polysiloxane.

9. The process according to claim 8;
wherein the aldehyde-functional siloxane obtained by hydrosilylating an SiH-functional siloxane with a terminally olefinic aldehyde.

10. The process according to claim 6;
wherein the polymer is obtained by a first step comprising reacting an SiH-functional polysiloxane with an aliphatic terminally olefinic aldehyde at temperatures of 20 to 200° C. by hydrosilylation in the presence of a Karstedt catalyst; and
wherein the polymer obtained by the first step is then reacted with the nitrogen-monosubstituted hydroxylamine at temperatures of 20 to 200° C.

11. A process for preparing polymers according to claim 1, the process comprising:
reacting a polymer comprising silicon and one or more aldehyde or keto groups, with a nitrogen-monosubstituted hydroxylamine.

12. A method of manufacturing a preparation, comprising:
adding polymers according to claim 1 in the manufacture of the preparation.

13. The method according to claim 12;
wherein the polymers according to claim 1 are present in the preparation in an amount of from 0.1 to 99% (w/w of, based on the preparation; and
wherein the preparation includes at least one further polymer containing double bonds and/or further functional groups.

14. The method according to claim 12;
wherein the preparation includes further additives selected from the group consisting essentially of:
siccatives, flow control agents, colours and/or colour pigments, wetting agents, binders, reactive diluents, surfactants, thermally activatable initiators, photoinitiators, catalysts, emollients, emulsifiers, antioxidants, hydrotropes (or polyols), solid and filler materials, pearl lustre additives, insect repellents, antifoulants, nucleators, preservatives, optical brighteners, flame retardants, antistats, blowing agents, plasticizers/softeners, perfumes, active ingredients, care additives, superfatting agents, solvents; and viscosity modulators.

15. A preparation comprising:
the polymers according to claim 1 in an amount of from 0.1 to 99 wt % based on the preparation; and
at least one further polymer which contains double bonds and/or further functional groups.

16. The preparation according to claim 15;
wherein the viscosity of the preparation is below 5000 mPa·s.

17. The preparation according to claim 15;
wherein the preparation is a coating or a printing ink.

18. The polymers according to claim 3;
wherein $R^2$ is selected from the group consisting of:
—$CH_2$—$CH_2$—$CH_2$—O—($CH_2$—$CH_2$O—)$_x$—($CH_2$—$CH(R^I)O$—)$_y$—$R^{II}$;
—$CH_2$—$CH_2$—O—($CH_2$—$CH_2$O—)$_x$—($CH_2$—$CH(R^I)O$—)$_y$—$R^{II}$;
—$CH_2$—$CH_2$—$CH_2$—O—$CH_2$—$CH(OH)$—$CH_2OH$;
—$CH_2$—$CH_2$—$(O)_{x'}$—$CH_2$—$R^{IV}$, —$CH_2$—$R^{IV}$; and
—$CH_2$—$CH_2$—$CH_2$—O—$CH_2$—$C(CH_2OH)_2$—$CH_2$—$CH_3$;
where:
x is from 0 to 100;
x' is 0 or 1;
y is from 0 to 100;
$R^I$, $R^{II}$ and $R^{III}$ are each as defined above; and
$R^{IV}$ represents $C_1$-$C_{50}$-alkyl, cyclic $C_1$-$C_{50}$-alkyl.

19. The polymers according to claim 3;
where $R^4$ represents a substituted or unsubstituted, branched or unbranched $C_1$-$C_{30}$-alkylene which may also be interrupted by heteroatoms and in the case of interruption by nitrogen this nitrogen may also be quaternized, cyclic $C_3$-$C_{30}$-alkylene, substituted or unsubstituted $C_1$-$C_{30}$-alkyleneoxy, substituted or unsubstituted $C_6$-$C_{30}$-arylene, substituted or unsubstituted $C_6$-$C_{30}$-aryleneoxy, substituted or unsubstituted $C_1$-$C_{12}$-alkene-$C_6$-$C_{12}$-arylene, which may also be interrupted by heteroatoms and in the case of interruption by nitrogen this nitrogen may also be quaternized, and bear sulphates, chlorides and carboxylates, especially citrates, lactates, stearates and acetates as counter-ions.

20. The polymers according to claim 3;
where $R^4$ represents a radical of formulae IIIa to IIIi:

where nitrone is a radical of formula (II); and
where Si represents the siloxane.

21. A method of manufacturing a preparation, comprising:
adding polymers obtained according to claim 6 in the manufacture of the preparation.

22. The method according to claim 21;
wherein the polymers obtained according to claim 6 are present in the preparation in an amount of from 0.1 to 99% (w/w of, based on the preparation; and
wherein the preparation includes at least one further polymer containing double bonds and/or further functional groups.

23. The method according to claim 21;
wherein the preparation includes further additives selected from the group consisting essentially of:
siccatives, flow control agents, colours and/or colour pigments, wetting agents, binders, reactive diluents, surfactants, thermally activatable initiators, photoinitiators, catalysts, emollients, emulsifiers, antioxidants, hydrotropes (or polyols), solid and filler materials, pearl lustre additives, insect repellents, antifoulants, nucleators, preservatives, optical brighteners, flame retardants, antistats, blowing agents, plasticizers/softeners, perfumes, active ingredients, care additives, superfatting agents, solvents; and viscosity modulators.

24. A preparation comprising:
polymers obtained according to claim 6 in an amount of from 0.1 to 99 wt % based on the preparation; and
at least one further polymer which contains double bonds and/or further functional groups.

25. The preparation according to claim 24;
wherein the viscosity of the preparation is below 5000 mPa·s.

26. The preparation according to claim 24;
wherein the preparation is a coating or a printing ink.

\* \* \* \* \*